Feb. 9, 1932.  T. F. SPACKMAN  1,844,611
OIL FILTER
Filed Feb. 10, 1930  3 Sheets-Sheet 3
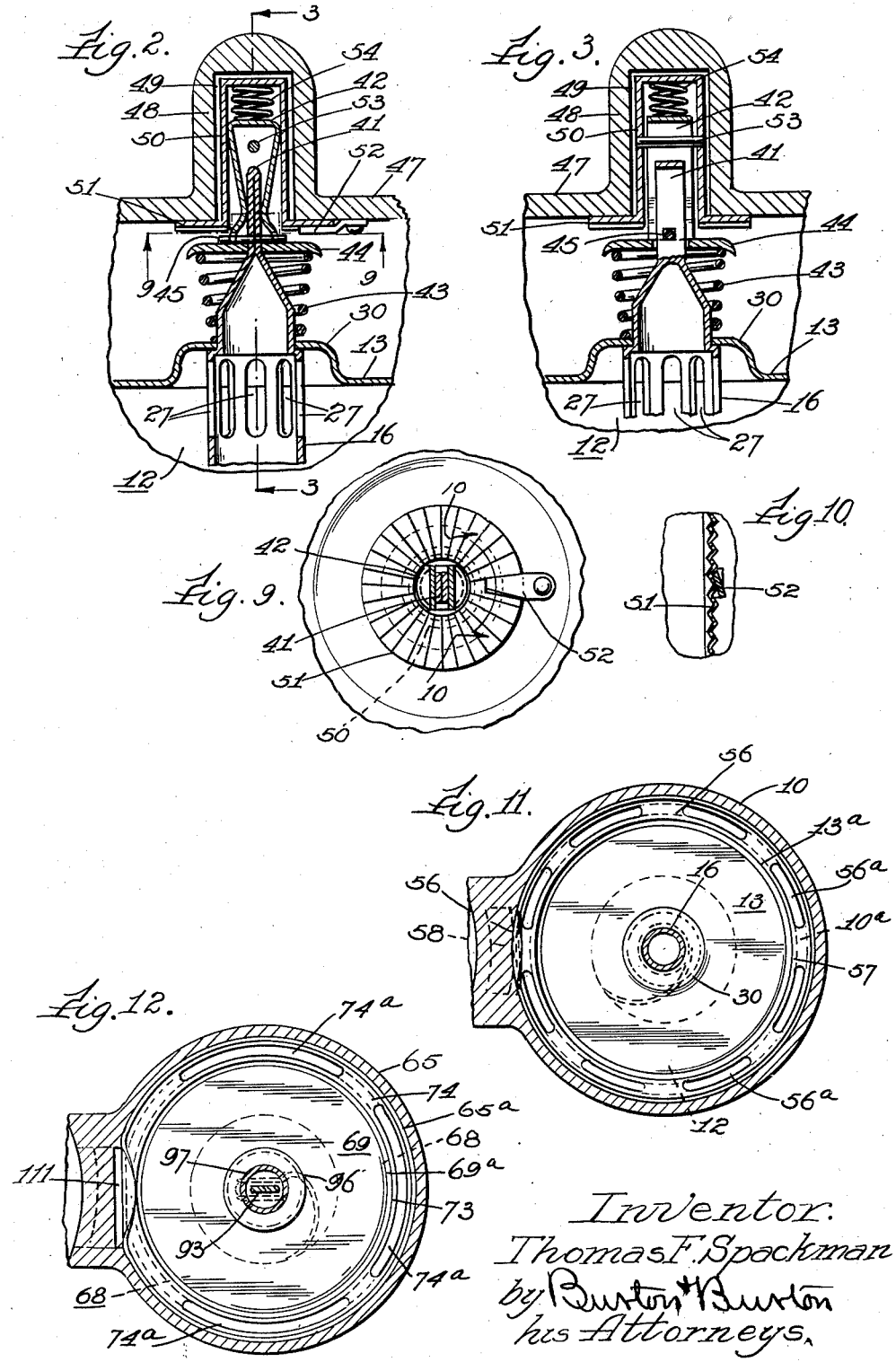

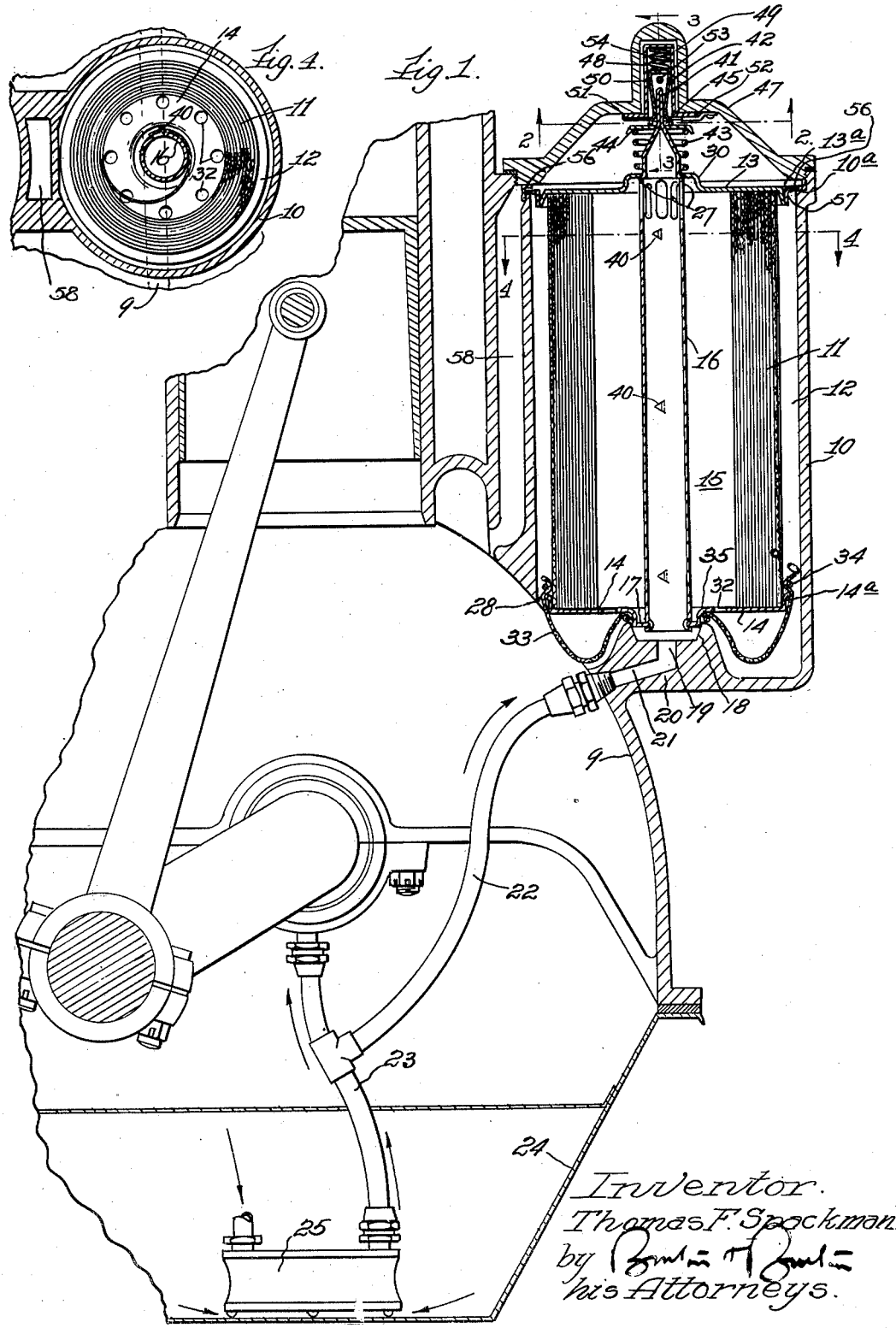

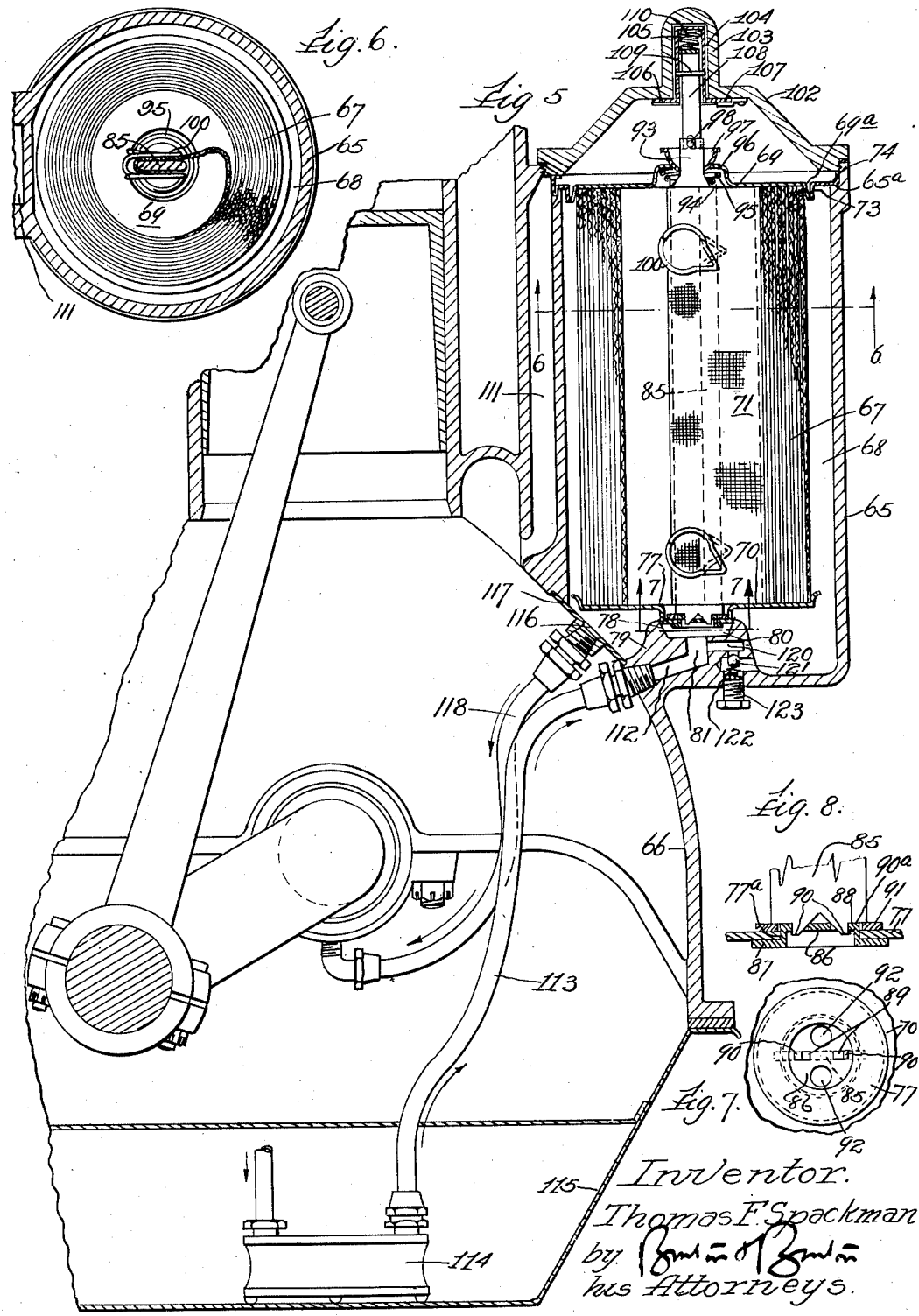

Patented Feb. 9, 1932

1,844,611

UNITED STATES PATENT OFFICE

THOMAS F. SPACKMAN, OF CHICAGO, ILLINOIS, ASSIGNOR TO STEWART-WARNER CORPORATION, OF CHICAGO, ILLINOIS, A CORPORATION OF VIRGINIA

OIL FILTER

Application filed February 10, 1930. Serial No. 427,239.

The present invention relates to filtering devices for purification of lubricants for internal combustion engines, and has for its main object to produce an efficient device of improved and simplified construction. Another object is to embody as an integral part of the motor shell the casing of the filtering device which is also arranged to serve as an inlet for introducing a fresh supply of lubricant into the engine. A further object is to produce an improved device of the type employing a filtering element in the form of a roll of fabric in which a contaminated layer of the fabric is automatically removed from the roll when the casing is opened. A still further object resides in the provision of an improved filtering device especially adapted for use in connection with new engines to ensure filtering out of the lubricant any small metal particles such as result from the machining operations on the various working parts, and the fine sand particles which may come loose from the surfaces of the castings, in addition to the free carbon particles that form and get into the lubricant. It consists in certain features and elements of the construction in combination as herein shown and described, as indicated by the claims.

In the drawings:

Figure 1 is a fragmentary sectional view through an internal combustion engine taken through a medial plane of the filtering device embodying the present invention.

Figure 2 is a reproduction upon an enlarged scale of the upper portion of Figure 1.

Figure 3 is a section at the line 3—3 on Figures 1 and 2.

Figure 4 is a transverse sectional view through the filtering device taken at line 4—4 on Figure 1.

Figure 5 is a view similar to Figure 1 showing a modified filtering device employed in a slightly different arrangement in connection with an internal combustion engine.

Figure 6 is a transverse sectional view through the filtering device taken at line 6—6 on Figure 5.

Figure 7 is a fragmentary view looking at the lower end of the filtering element proper as indicated by lines 7—7 on Figure 5.

Figure 8 is an enlarged sectional view of the lower end of the filtering element illustrating the manner of attachment of the spindle to the lower head.

Figure 9 is a section at the line 9—9 on Figure 2.

Figure 10 is a section at the curved line 10—10 on Figure 9.

Figure 11 is a section at the line 11—11 on Figure 1.

Figure 12 is a section at the line 12—12 on Figure 6.

For the purpose of illustration, the filtering device embodying the present invention is shown in connection with a lubricating system in which a portion of the lubricant in the crank case is constantly by-passed directly to the bearings and the remaining portion is passed through the filtering device from which it is returned to the crank case and admixed with the slightly contaminated oil being returned from the parts lubricated. It is recognized that by thus constantly filtering a portion of the lubricant, practically all of the impurities in the system are eventually removed. It is also to be understood that the filtering device illustrated in Figures 1 to 4 inclusive, may be readily adapted to a system such as illustrated in Figure 5, in which all of the lubricant is caused to pass through the filtering device and is then distributed to the bearings and various parts to be lubricated whence it is again returned to the reservoir in the crank case for repeating the purification process.

Although my improved filtering device may be made as a separate unit, I prefer to directly associate it with the internal combustion engine as illustrated in Figure 1 by forming the casing, 10, of the filtering device as an integral part of the motor shell, 9. Removably mounted in said casing, 10, is a filtering element comprising an annular roll of filtering fabric, 11, disposed in spaced relation with respect to the internal wall of the casing so as to form a chamber, 12, thereabout. This roll of filtering fabric is embraced endwise between upper and lower heads, 13 and 14, respectively, which form an internal cavity, 15, in said roll. Axially positioned in said roll and journaled for rotation in said upper and lower heads is a tubular spindle, 16, terminating at its lower end slightly below the downwardly offset central boss, 17, formed in the lower head, 14, and as shown engaged rotatably with the lower head at the center of the boss, 17. This central boss, 17, is adapted to be seated in a tapered recess, 18, concentric with the inlet opening, 19, formed in the boss, 20, integral with the motor shell, by means of which the entire filtering element is centralized in the casing.

The inlet, 19, is substantially central with the tubular spindle, 16, and has the opposite end of its passageway, 21, connected by a branch tube, 22, which is an off-shoot of the main supply tube, 23, through which the lubricant in the reservoir of the crank case indicated at 24 is force-fed directly to the bearings and other parts to be lubricated by means of a pump, 25, disposed in the bottom of the crank case.

The tubular spindle is provided with one or more apertures, 27, adjacent its upper end and extending partly above the top of the roll of filtering fabric through which apertures the lubricant to be filtered is discharged from the interior of the tubular spindle into the cavity of the roll. It is then forced under pressure of the pump through the filtering roll, and the filtered or purified lubricant entering the chamber, 12, is discharged through the opening, 28, by which the interior of the chamber, 12, is in direct communication with the crank case proper. The upper head, 13, is embossed as at 30, so as to enclose the upper ends of the apertures, 27, in the tubular spindle.

Surrounding said downwardly projecting boss, 17, of the lower head are a plurality of apertures, 32, in registration with the cavity of the filter roll, through which apertures a portion of the lubricant to be filtered is permitted to pass downwardly. An annular sack, 33, of any suitable filtering fabric, such as "canton flannel" is rigidly secured at its outer edge to the exterior of the roll just above the up-turned flanges, 14ᵃ, of the lower head, by means of a spring ring, 34, and the inner edge of said sack is firmly secured to the circular boss, 17, by a spring ring, 35; it being understood that this piece of filtering fabric is so dimensioned as to form a substantially annular pocket, as seen in Figure 1. This supplemental filtering feature is especially advantageous when used in connection with a new engine, because the small metal particles such as result from the various machining operations on the parts of the motor, sand and other impurities, are usually of greater specific gravity than the oil or lubricant and consequently tend to settle at the bottom, and in doing so they will pass through the apertures, 32, into the filtering sack, 33. This sack also tends to accumulate a portion of the other residue and impurities which first tend to cling to the inner surface of the fabric, 11, of the roll but are dislodged when the fabric is unwound from the roll and wound onto the spindle, as will hereinafter be described.

It may be understood that the sack, 33, is not primarily designed for filtering, but for collecting the coarser material mentioned; and any liquid which may pass through it before it becomes clogged may be understood as in the same category as the portion of liquid which is pumped directly to the engine bearings, as above mentioned, but with the benefit of having been relieved of the coarse material mentioned. But the material of which the sack, 33, is made, is such as to sufficiently retard the passage of the liquid so that the pump will keep the filter occupied and under proper pressure for filtering through the filter roll.

The inner end of the fabric of the filtering roll may be secured to the spindle in any suitable manner, and as herein shown the spindle is formed with a plurality of outwardly projecting tangs, 40, onto which this end of the fabric may be hooked, as illustrated in Figure 4. The upper end of the spindle above the upper head, 13, is flattened to form a tongue, 41, which is adapted to be straddled by a driving yoke, 42. Mounted on top of the boss, 30, of the upper head is a coil spring, 43, surrounding said spindle and engaged at its upper end by a disk, 44, held in position by a transverse pin, 45, which extends through the tongue portion, 41, of the spindle, and serves as the driving connection for the forked lower end of the yoke, 42, by extending through the yoke fork ends. When the spring, 43, is held in position by the cross pin, 45, engaging the plate, 44, the upper and lower heads are permanently locked in place with the filtering roll spindle in operative relation.

A cap, 47, has threaded engagement with the upper end of the casing, 10, for completely encasing or enclosing the filtering element. This cap is formed with a hollow, central projection, 48, which is provided with an internal chamber, 49, in which chamber is disposed the cylindrical portion, 50, of the thimble-like ratchet, 51, having ratchet teeth formed as radial corrugations in its transverse flange. This ratchet member is held in position in the chamber, 49, by means of one or more spring pawls, 52, indicated in Figure 2. Extending upwardly into the cylindrical portion, 50, of the ratchet is the upper end of the driving yoke, 42, which is connected for limited axial movement relative thereto by means of a cross pin, 53. Interposed between the upper end of the driving yoke and the top of the cylindrical portion, 50, of the ratchet thimble, is a coil spring, 54, normally tending to urge the driving yoke, 42, downwardly. Thus when the cap, 47, is placed in position on the casing with the driving yoke in engagement with the tongue, 41, of the spindle, and the pin, 45, the spring, 54, tends to yieldingly maintain the parts in operative relation.

It will now be apparent that by rotation of the cap, 47, in one direction, the spring pawl, 52, will be caused to slip over the ratchet teeth, thus permitting the drive mechanism between the spindle and the cap to remain substantially stationary while the cap is being rotated relatively to the casing; while by rotating the cap in the opposite direction the pawl, 52, is caused to engage the teeth of the ratchet, thereby transmitting the rotation of the cap through the ratchet element directly to the driving yoke and thence to the pin and tongue of the spindle, causing the latter to wind thereon the filtering fabric from the inside of the roll.

The parts may be so arranged that the spindle will be rotated either when the cap is screwed onto the casing or when it is rotated in a direction for removal; but, as shown in Figures 1 to 4, I have arranged the parts so that the spindle will be rotated and will remove the contaminated layer of fabric from the interior of the roll when the cap is unscrewed from the casing. To this end the ratchet is formed for its feeding engagement with the pawl in the rotation of the cap in the direction for unscrewing the latter from the casing and for winding the filter web onto the spindle, 16; so that after rotating the cap to any extent necessary for winding as much of the contaminated web on the spindle as judged necessary to expose an uncontaminated part for filtering, the cap may be rotated in the opposite direction for screwing it into the casing without thereby rotating the spindle in the opposite direction which would unwind from it the contaminated web wound onto it in the first step. The construction described permits rotation of the spindle when the cap has been unscrewed and entirely removed, the operator in that case grasping the flattened upper end of the spindle and operating it directly in the proper direction for winding the contaminated web onto it through the necessary amount for exposing fresh uncontaminated web for filtering. To insure that the upper end of the filtering element will be centered in the casing, the latter is formed with an annular shoulder, 10$^a$, on which is seated an annular member, 56, having its inner edge formed with a downwardly extending flange, 57, in which is seated but not fluid-tight a downwardly trending outer edge, 13$^a$, of the upper head, 13, and furnished with one or more apertures, 56, which give acces to the annular chamber, 12, for a purpose hereinafter explained.

Formed in the motor shell adjacent the filtering casing, 10, is a downwardly extending passageway, 58, opening at its upper end into the casing above the upper head, 13, and at its lower end into the interior of the crank case, as seen in Figure 1. The upper end of the passageway is normally closed by the cap, 47, when it is in place on the casing, and when the cap is removed, a fresh supply of lubricant may be introduced into the system through this passageway.

Thus my improved arrangement does not require any additional attention beyond that normally given the engine in replenishing the supply of lubricant; and after unscrewing the cap and pouring in a fresh supply of oil, as he would ordinarily do through the usual inlet, the attendant or driver, by merely removing the cap automatically shifts the contaminated layer of filtering fabric onto the central hollow spindle, 16, and uncovers a fresh layer of filtering fabric on the inner surface of the filter roll.

This construction, in general, is of particular advantage in that it is relatively compact, and being thus associated with the engine shell eliminates all exterior tube connections and takes the place of the usual oil supply opening which must otherwise be provided at some point in the system.

The construction being relatively simple, the filtering element proper may be either wholly replaced after the roll of fabric has been completely utilized, or simply a new roll of fabric may be substituted; and likewise the supplemental filtering sack, 33, may be removed, and cleansed, and replaced, or an entirely new sack may be substituted. It has been found in using a filtering fabric in the roll form that a single thickness of fabric performs most of the screening and filtering out the impurities so that they build up on the inner surface of the roll while the substantially clarified oil finds its way through the remaining layers of fabric and out through the outer surface of the roll; and that when this single contaminated inner layer of fabric is removed by winding it onto the spindle, the next layer will be relatively free of the impurities and will be capable of efficiently continuing the purification of the lubricant.

The modified construction illustrated in Figures 5 to 8, inclusive, is similar to the construction illustrated in Figures 1 to 4 in many respects. The casing, 65, of the filtering device is also formed integral with the shell, 66, of the motor housing; and disposed centrally in the casing, 65, is a filtering element, including an annular roll of filtering fabric, indicated at 67, disposed in spaced relation in the casing to form an annular chamber, 68, thereabout. The ends of the roll, 67, are embraced between upper and lower heads, 69 and 70, respectively, closing off the ends of the roll to form a cavity, 71.

The upper end of the filtering element is centralized in the same manner as in Figure 1 by the downwardly trending flanges, 69ª, at the outer periphery of the head, 69, engaged in the offset seat, 73, of an annular ring, 74, identical with the annular member, 56, of Figure 1, seated on an annular shoulder, 65ª, at the upper end of the casing, 65, and furnished with one or more apertures, 74ª, which afford access to the annular chamber, 68, for a purpose hereinafter explained. The lower head, 70, is formed with a central downwardly projecting boss, 77, adapted to be firmly seated in a tapered annular recess, 78, formed in a boss, 79, integral with the casing and motor shell. This offset boss, 77, in addition to seating and centering the lower end of the filtering element, serves to provide a seal for the small chamber, 80, formed therebelow and with which communicates the inlet, 81.

Axially positioned inside of the filtering roll is a spindle, 85, in the nature of a flat bar and journaled for rotation in both upper and lower heads, 69 and 70, respectively. The lower head, 70, is provided with an aperture, 77ª, substantially central of the boss 77, in which is seated a circular fitting, 86, having a flange, 87, positioned against the under side of the boss, 77, and an upwardly offset circular portion, 88, extending upwardly through said aperture and provided with two elongated apertures, 89, in which are adapted to extend a pair of prongs, 90, formed at the lower end of the spindle, 85. After these prongs have been inserted through the apertures, 89, they are peened over at the under side so as to form a substantially rigid connection to the circular fitting, 86.

A washer, 91, is interposed between the upper side of the boss, 77, and the shoulder, 90ª, formed by the lugs on the end of the spindle, 90, so as to ensure free rotation of the spindle relative to the boss, 77, of the lower head. The circular fitting, 86, is provided with a pair of apertures, 92, on opposite sides of the spindle, 85, which serve to provide communication between the chamber, 80, and the interior of the roll of cavity, 71. The upper end of the spindle is reduced as at 93, forming a shoulder, 94, on which is seated a coil spring, 95, abutting at its upper end against the under side of an upwardly offset central boss, 96, of the upper head, 69. Mounted on the reduced end, 93, of the spindle is a cup-shaped washer, 97, which seats firmly against the upper side of the boss, 96, and a pin, 98, extends transversely through the upper end of said reduced end, 93, of the spindle, and engages the upper edges of the cup-shaped washer by means of which construction the heads are yieldingly secured to the filtering roll with the spindle in operative relation therewith. The fabric of the filtering roll may be secured to the spindle in any convenient manner, and as herein shown, I provide spring clips, 100, which secure the inner end of the fabric web to the spindle so as to permit winding thereon the contaminated layers of fabric from the interior of the roll.

The cap, 102, has threaded engagement with the upper end of the casing, 65, and serves to completely encase or enclose the filtering element. The drive connections between the cap and spindle are substantially the same as that shown in Figure 1, and the cap is provided with a central upwardly extending projection, 103, having an annular cavity, 104, in which is disposed the cylindrical portion, 105, of the ratchet thimble, 106, which seats against the under side of the cap. This ratchet thimble is formed with a series of transverse, radially extending ratchet teeth, adapted to be engaged by a spring pawl, 107, secured to the inner side of the cap. A driving yoke, 108, is connected for a limited range of movement with the cylindrical portion, 105, by a cross pin, 109, and its lower end is provided with open slots for engaging the pin, 98, at opposite sides of the reduced portion, 93, of said spindle, adapting the yoke to serve as a driving connection between the cap and the spindle. A coil spring, 110, is interposed between the top of the driving yoke, 108, and the inner side of the upper end of the cylindrical part, 105, normally tending to urge the driving yoke downwardly and for yieldingly maintaining it in operative engagement with the upper end of the spindle.

It is to be understood that this mechanism functions in substantially the same manner as that described in connection with Figures 1 to 4 inclusive; that is, upon rotation of the cap in one direction, as in removing it, the ratchet pawl, 107, is inoperative, permitting the spindle to remain substantially stationary with respect to the filtering element; but upon rotating the cap in the other direction, namely, in the direction for replacing the cap on the casing after replenishing the oil supply, the ratchet becomes operative and provides a driving engagement for rotating the spindle with the cap, thus winding up a layer of contaminated fabric from the inner side of the roll.

A downwardly extending passageway, 111, is formed in the motor shell adjacent the filter casing, 65, and opens at its lower end into the interior of the crank case, while its upper end opens into the filter casing above the upper head, 69, and is normally closed by the cap, 102, when in place on the casing. Thus when the cap is removed, this passageway serves as a filler pipe for fresh lubricant.

The inlet, 81, is substantially central with the chamber, 80, intermediate the apertures, 92, and the circular fitting, 86, and is connected by a passage, 112, in the boss, 79, to the interior of the motor crank case, 66, which passage is connected by a tube, 113, to the pump, 114, disposed in the bottom of the oil pan, 115. This pump serves to supply the lubricant to be filtered under pressure through the tube, 113, passageway, 112, and through the apertures, 92, into the interior or cavity, 71, of the roll, the normal pressure on the lubricant by the pump being sufficient to force the lubricant outwardly through the roll of fabric, and the filtered or purified lubricant collecting in the annular chamber, 68, is permitted to be discharged through the outlet of the closure plate, 117, which outlet is connected by a feed tube, 118, for returning the purified lubricant to the system.

Upon starting the operation of the engine, and under some circumstances after the engine has been running, it is desirable to introduce fresh lubricant which may pass directly to the bearings without passing through the filtering element,—which is unnecessary,—the fresh lubricant requiring no cleansing. For this purpose the ring, 56, of Figure 1, and the ring, 74, of Figure 5 are furnished with apertures, 56a and 74a, respectively, as described, so that upon removing the cap, 47 of Figure 1, or 102 of Figure 5, lubricant may be introduced through the apertures, 56a or 74a, into the annular chambers, 12 and 68 respectively, outside the filtering element, from which chambers the lubricant passes,—in Figure 1, by the port 19, passage 21 and pipe 22; and in the construction of Figure 5, by the port, 116 and pipe, 118, to the bearings to be lubricated.

The inlet passageway, 112, is formed with a branch passageway, 120, by means of which direct communication may be had between the inlet passageway and the outlet passageway, 116, which permits the lubricant to be by-passed for direct return to the system without being filtered or purified. A valve, 121, is provided for controlling the discharge opening in the branch, and includes a ball valve, 121, held yieldingly seated by a spring 122, adjustably tensioned by a set screw, 123. This screw extends exteriorly of the casing, 65, for manual adjustment for varying the seating tension on the valve so that the lubricant may be by-passed when a predetermined pressure builds up in the cavity of the roll. If, for example, the filtering action becomes impaired by accumulation of impurities on the fabric and the pressure of the lubricant inside of the roll becomes so great as to exert a back pressure through the line, it will cause unseating of the valve, 121a, permitting the lubricant to be by-passed and returned directly to the system without being filtered.

I claim:

1. In a filtering device, in combination with a casing having an inlet adapted for connection to a source of liquid to be filtered, and an outlet for return of the filtered liquid to the system, a filtering unit including an annular roll of filtering fabric disposed in spaced relation in said casing forming a chamber thereabout, means affording communication for passage of the liquid to be filtered from the inlet connection to the interior of the filtering unit and from the exterior thereof to the outlet, a cap rotatably associated with the casing for enclosing the filtering unit and removable from said casing to permit replenishing the liquid supply in the system, and means responsive to the rotation of said cap for removing the contaminated layer of fabric from the roll.

2. In a filtering device, in combination with a casing having an inlet adapted for connection to a source of liquid to be filtered, and an outlet for return of the filtered liquid to the system, a filtering unit including an annular roll of filtering fabric disposed in spaced relation in said casing forming a chamber thereabout, means affording communication for passage of the liquid to be filtered from the inlet to the interior of the roll and from the exterior thereof to the outlet, a cap removably associated with the casing for enclosing the filtering unit therein, and means responsive to the removal of said cap for removing the contaminated layer from the inside of the annular filtering element.

3. In a filtering device, in combination with a casing having an inlet adapted for connection to a source of liquid to be filtered, and an outlet for return of the filtered liquid to the system, a filtering unit including an annular roll of filtering fabric disposed in spaced relation in said casing forming a chamber thereabout, a cap rotatably associated with the casing for enclosing the filtering element, and means operative upon rotation of said cap in one direction only, for removing a contaminated layer of fabric from the inside of the annular roll.

4. In a filtering device, in combination with a casing having an inlet adapted for connection to a source of liquid to be filtered, and an outlet for return of the filtered liquid to the system, a filtering unit including an annular roll of filtering fabric disposed in spaced relation in said casing forming a chamber thereabout, upper and lower heads between which said annular roll is embraced endwise, an axially positioned spindle arranged for rotation inside of the annular roll, a cap rotatably and removably associated with the casing for enclosing the filtering element, and means interconnecting said spindle and cap responsive to the rotation of said cap in one direction only for rotating the spindle to wind up a contaminated layer of fabric from the inside of the roll.

5. In a filtering device, in combination with a casing having an inlet adapted for connection to a source of liquid to be filtered, and an outlet for return of the filtered liquid to the system, a filtering unit including an annular roll of filtering fabric disposed in spaced relation in said casing forming a chamber thereabout, upper and lower heads between which the annular roll is embraced endwise, an axially positioned spindle arranged for rotation inside of said roll, a cap rotatably and removably associated with the casing for enclosing the filtering element, and means including detent mechanism carried by the cap and removable therewith, and detachably engageable with the spindle, whereby rotation of said cap in one direction only rotates said spindle for winding up a comtaminated layer of fabric from the inside of the roll.

6. In a filtering device, a casing having an inlet for connection to a source of liquid to be filtered, and an outlet for return of the filtered liquid to the system, a filtering unit including an annular roll of filtering fabric disposed in spaced relation in said casing forming a chamber thereabout, upper and lower heads between which the annular roll is embraced endwise, means affording communication for passage of the liquid to be filtered from the inlet to the interior of the roll and from the exterior thereof to the outlet, a spindle axially positioned inside the roll for rotation in said heads, a cap rotatably and removably connected to the casing for enclosing the filtering element, and means interconnecting said cap and spindle and responsive to the rotation of the cap in one direction for removing a contaminated layer of fabric from the inside of the roll, said heads and casing having communicating passages arranged to permit introduction of a fresh supply of liquid to the system through said chamber when the cap is removed.

7. In a filtering device, a casing having an inlet for connection to a source of liquid to be filtered, and an outlet for return of the filtered liquid to the system, a filtering unit including an annular roll of filtering fabric disposed in spaced relation in said casing forming a chamber outside said roll, upper and lower heads between which the annular roll is embraced endwise, means affording communication for passage of the liquid to be filtered from the inlet to the interior of the roll and from the exterior thereof to the outlet, a ring mounted in the upper end of the casing, adapted to form a seat for the upper head and centralize the annular roll, means operable exteriorly of the casing for removing a contaminated layer of fabric from the inside of the roll, and a cap removably connected to the casing for enclosing the filtering element, said ring being provided with one or more apertures therein in communication with the casing chamber outside the filter roll.

8. In combination with the motor shell of an internal combustion engine, a lubricant filtering device including a casing formed integrally with the motor shell and having an inlet for connection to the source of lubricant supply in the crank case, and an outlet for return of the filtered lubricant to the system, a filtering element including an annular roll of filtering fabric disposed in spaced relation in said casing to form a chamber thereabout, upper and lower heads between which the annular roll is embraced endwise, means affording communication for passage of the liquid to be filtered from the inlet to the interior of the roll and from the exterior thereof to the outlet, a spindle arranged axially in the roll and journaled in the heads, a cap removably connected to the casing for enclosing the filtering element, the spindle being provided with means at its upper end and accessible when the cap is removed for rotating the spindle for winding up a contaminated layer of filtering fabric from the inside of the roll, said heads and casing having communicating passages arranged to permit introduction of a fresh supply of lubricant to the system when the cap is removed.

9. In combination with the motor shell of an internal combustion engine, a lubricant filtering device including a casing formed integrally with the motor shell and having an inlet for connection to the source of lubricant supply in the crank case, and an outlet for return of the filtered lubricant to the system, a filtering element including an annular roll of filtering fabric disposed in spaced relation in said casing to form a chamber thereabout, upper and lower heads between which the annular roll is embraced endwise, means affording communication for passage of the liquid to be filtered from the inlet to the interior of the roll and from the exterior thereof to the outlet, a spindle arranged axially in the roll and journaled in the heads, a cap rotatably and removably associated with the casing for enclosing the filtering element, and means interconnecting said spindle and cap and responsive to the rotation of the cap in one direction only for rotating said spindle for removing a contaminated layer of fabric from the interior of the roll, said heads and casing having communicating passages arranged to permit admission of a fresh supply of lubricant to the system when the cap is removed.

10. In combination with the motor shell of an internal combustion engine, a lubricant filtering device comprising a casing formed integrally with the motor shell and having an inlet for connection to a source of lubricant supply in the crank case, a filtering element including an annular roll of filtering fabric disposed in said casing in spaced relation to form a chamber thereabout, the casing having an opening for direct communication between the chamber and the crank case for return of the filtered lubricant to the system, a cap removably connected to the casing for enclosing the filtering element, and means accessible when the cap is removed for removing a contaminated layer of fabric from the inside of the roll, said casing and element having communicating passages arranged to permit introduction of a fresh supply of lubricant to the system when the cap is removed.

11. In a lubricant filtering device, a casing having an inlet for connection to a source of lubricant to be filtered, and an outlet for return of the filtered lubricant to the system in which it is employed, a filtering element including an annular roll of filtering fabric disposed in spaced relation in said casing forming a chamber thereabout, upper and lower heads between which said roll is embraced endwise, means affording communication for passage of the lubricant to be filtered from the inlet to the interior of the roll and from the exterior thereof to the outlet, said lower head being provided with one or more apertures in registration with the cavity thereof for passage of a portion of the lubricant to be filtered, a piece of filtering fabric secured to said lower head for filtering the lubricant passing through said apertures, said means also being arranged for conducting the lubricant filtered through said piece of fabric to the outlet, and exteriorly operable means for removing a contaminated layer of fabric from the inside of the roll.

12. In a combination with a motor shell of an internal combustion engine, a lubricant filtering device comprising a casing formed integrally with the motor shell and having an inlet for connection to a source of lubricant supply in the crank case, a filtering element including an annular roll of filtering fabric disposed in spaced relation in said casing forming a chamber thereabout, the casing having an opening for direct communication between said chamber and the crank case, for return of the filtered lubricant to the system, upper and lower heads between which said roll is embraced endwise, said lower head being provided with one or more apertures, an annular filtering sack formed of a piece of filtering fabric secured to the lower head in registration with the apertures, means affording communication for passage of the lubricant to be filtered from the inlet to the interior of the roll, a portion thereof passing downwardly through the apertures into the annular sack and filtering into the chamber, and a portion filtering through the roll into said chamber, said casing being formed to conduct the filtered lubricant from the chamber through said opening directly into the crank case, and means operable at will for removing a contaminated layer of fabric from the inside of the roll.

13. In a lubricant filtering device, a casing having an inlet for connection to a source of lubricant to be filtered, and an outlet for return of the filtered lubricant to the system in which it is employed, a filtering element including an annular roll of filtering fabric disposed in spaced relation in said casing forming a chamber thereabout, upper and lower heads between which said roll is embraced endwise, a tubular spindle axially positioned in the roll in registration with the inlet, and journaled in said heads, said upper head having an upwardly projecting central boss, and the tubular spindle being apertured adjacent its upper end above the top of the roll for discharging lubricant to be filtered into the roll cavity from which it filters through said annular roll into the chamber for discharge through the outlet, and means operable at will for rotating said spindle for removing a contaminated layer of fabric from the inside of the roll.

14. In a lubricant filtering device, a casing having an inlet for connection to a source of lubricant to be filtered, and an outlet for return of the filtered lubricant to the system in which it is employed, a filtering element including an annular roll of filtering fabric disposed in spaced relation in said casing forming a chamber thereabout, upper and lower heads between which said roll is embraced endwise, a tubular spindle axially positioned in the roll in registration with the inlet, and journaled in said heads, said upper head having an upwardly projecting central boss, and the tubular spindle being apertured adjacent its upper end above the top of the roll for discharging lubricant to be filtered into the roll cavity from which it filters through said annular roll into the chamber for discharge through the outlet, a cap rotatably and removably connected to the casing for enclosing the filtering element, and means interconnecting said cap and spindle and responsive to the rotation of the cap in one direction for rotating the spindle and removing a contaminated layer of fabric from the inside of the roll.

15. In the combination defined in claim 14, the lower head being provided with one or more apertures, an annular sack of filtering fabric secured to the bottom of the lower head in registration with said apertures for fitting the lubricant admitted from the roll cavity through said apertures in the lower head.

16. In combination with a motor shell of an internal combustion engine, a lubricant filtering device comprising a casing formed integrally with the motor shell and having an inlet for connection with a source of supply in the crank case, said casing being provided with a counter-bored recess concentric with the inlet opening, a filtering element including an annular roll of filtering fabric and upper and lower heads between which said roll is embraced endwise and disposed in said casing in spaced relation to form a chamber thereabout, said casing having an opening for direct communication between the crank case and chamber, the lower head being formed with a downwardly projecting boss seated in the recess of the casing, and the upper head having an upwardly offset central boss, a tubular spindle disposed axially in the roll and journaled in said heads, with the lower end thereof in substantial registration with the recess, and its upper end being apertured above the top of the roll for discharging the lubricant into the roll cavity, from which a portion filters into the chamber for discharge through the opening into the crank case, the lower head having one or more apertures in registration with the roll cavity, an annular filter sack of filtering fabric secured to said lower head in registration with the apertures for filtering a portion of the lubricant in the roll cavity, a cap removably and rotatably associated with the casing, and means interconnecting said cap and spindle and responsive to the rotation of the cap in one direction for removing a contaminated layer of filtering fabric from the inside of the roll.

In testimony whereof, I have hereunto set my hand at Chicago, Illinois, this 6th day of Feb., 1930.

THOMAS F. SPACKMAN.